US 6,649,292 B2

United States Patent
Breuer et al.

(10) Patent No.: US 6,649,292 B2
(45) Date of Patent: Nov. 18, 2003

(54) FUEL CELL SYSTEM HAVING A REFORMER UNIT

(75) Inventors: Norbert Breuer, Ditzingen (DE); Christian Schiller, Leinf.-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 09/930,195

(22) Filed: Aug. 16, 2001

(65) Prior Publication Data

US 2002/0022163 A1 Feb. 21, 2002

(30) Foreign Application Priority Data

Aug. 16, 2000 (DE) .......................... 100 39 797

(51) Int. Cl.[7] .......................... H01M 8/00; H01M 8/18; H01M 8/04; H01M 8/12
(52) U.S. Cl. .............................. 429/19; 429/22; 429/13
(58) Field of Search ............................ 429/13, 17, 19, 429/22, 24, 25

(56) References Cited

U.S. PATENT DOCUMENTS 5,985,474 A  * 11/1999  Chen et al. .................. 429/17
6,083,637 A    7/2000  Walz et al.
6,266,576 B1 *  7/2001  Okada et al. ................ 700/245
6,383,670 B1 *  5/2002  Edlund et al. ............... 429/20
6,429,019 B1 *  8/2002  Goldstein et al. ........... 436/134

* cited by examiner

Primary Examiner—Randy Gulakowski
Assistant Examiner—Donald V. Scaltrito
(74) Attorney, Agent, or Firm—Walter Ottesen

(57) ABSTRACT

A fuel cell system has a reformer unit (1) for generating a reformate which is provided as a fuel for a fuel cell unit (4). The fuel cell system includes a sensor (5, 6, 7) for monitoring the quality of the reformate and a valve (9, 10) which can be controlled in dependence upon the sensor. Compared to conventional systems, the valve can react very rapidly to disturbances in the preparation of the reformate and can especially prevent that disturbances lead to damage of the fuel cell unit (4) and the electrical output power of the fuel cell unit continues to be controllable. This is achieved in that at least one storage unit (11) is provided for feeding fuel to the fuel cell unit (4) in dependence upon the quality of the reformate.

11 Claims, 1 Drawing Sheet

FUEL CELL SYSTEM HAVING A REFORMER UNIT

FIELD OF THE INVENTION

The invention relates to a fuel cell system having a reformer unit for generating a reformate which is provided as fuel for a fuel cell unit. The system further includes a sensor for monitoring the reformate quality and a valve which can be driven in dependence upon the sensor.

BACKGROUND OF THE INVENTION

Fuel cell technology gains ever more in significance especially in connection with future drive concepts of vehicles.

Fuel cells offer the possibility of converting chemically bonded energy directly into electrical energy which can be subsequently converted into mechanical drive energy with the aid of an electric motor. In contrast to thermal power engines, the efficiency of a fuel cell is not limited by the Carnot efficiency. Present day preferred fuel cells consume hydrogen and oxygen and convert these elements into the environmentally friendly end product, namely, water.

Because of the technical problems in the storage of hydrogen in vehicles, development has gone over to generate the hydrogen, as required, via a so-called reformation or partial oxidation of hydrocarbons. Hydrocarbons of this kind are present in the form of conventional fuels such as gasoline, diesel oil or natural gas; however, other hydrocarbons could also be used for this purpose, such as methane or methanol.

In conventional fuel cell systems, so-called PEM fuel cells are often used which, however, react especially to carbon monoxide components in the hydrogen-rich medium with adsorbed CO on the catalytic cathode so that the conversion of hydrogen at the electrode is made more difficult or is prevented. This CO-binding is referred to by experts generally with the term "poisoning" of the cathode. For this reason, fuel cell systems have to ensure the production of a substantially carbon monoxide free hydrogen-rich medium.

Accordingly, the carbon monoxide component in the hydrogen-rich reformate is almost completely reduced with the aid of reactors. In a first step, a reactor unit is connected downstream of the reformer and this reactor unit oxidizes the carbon monoxide to $CO_2$ while adding water via a so-called shift reaction whereupon hydrogen is, in turn, released. The carbon monoxide results from the conversion of the fuel. However, residual quantities of carbon monoxide remain contained in the reformate gas at a concentration which still leads to a non-tolerable poisoning of the fuel cell.

Reactor units are used to convert the residual carbon monoxide quantities which are still present. These reactor units, for example, almost completely reduce the residual carbon monoxide quantities by means of catalytic oxidation of the carbon monoxide while adding oxygen at a suitable oxidation catalytic converter. To reduce the carbon monoxide component to values less than 50 ppm, preferably multi-stage carbon monoxide oxidation units are utilized and oxygen is supplied, for examples, separately to each stage. The oxygen is often metered in the form of air oxygen.

In fuel cell systems, for example, short-term operating disturbances occur at the present time in the reformer as well as in the reaction unit connected downstream so that, for example, the CO concentration at the input of the fuel cell system exceeds a threshold value which sometimes leads to a comparatively long poisoning of the fuel cell. For this reason, gas sensors have been provided up to now which are mounted between the individual reactor units, that is, ahead of the fuel cell unit. A monitoring of the state of the reformate is made possible by these gas sensors and, with the aid of a suitable control apparatus, the control of the chemical processing of the fuel cell system is possible. The requirements placed on the gas sensors and their operation including their preferred arrangement in the fuel cell system are described, for example, in U.S. Pat. No. 6,083,637 which is incorporated herein by reference.

Also in U.S. Pat. No. 6,083,637, an arrangement is described which switches a valve in dependence upon the signals of the gas sensors so that the reformate having unsuitable quality is guided past the fuel cell unit. If possible operational disturbances occur in the reformer, that is, in the reactor units (that is, during the preparation of the reformate), the poisoning of the fuel cell unit is hereby prevented. However, it is disadvantageous that the supply of the fuel cell unit comes to a stop in the case of detouring the reformate, that is, the fuel. As a consequence, the electric output power of the fuel cell unit reduces sharply after a short time.

SUMMARY OF THE INVENTION

In contrast to the above, it is an object of the invention to provide a fuel cell system of the above kind which reacts very rapidly to disturbances during the preparation of the reformate. The fuel cell system especially prevents that disturbances lead to damage of the fuel cell unit and the electric output power of the fuel cell unit continues to be controllable.

The fuel cell system of the invention includes: a fuel cell unit; a reformer unit for generating a reformate as a fuel for the fuel cell unit; sensor means for monitoring the quality of the reformate; a storage unit for holding fuel which can be fed to the fuel cell; valve means for connecting the storage unit to the fuel cell unit so as to permit fuel contained in the storage unit to be fed to the fuel cell unit in dependence upon the quality of the reformate; and, control means for driving the valve means in dependence upon the sensor means.

The fuel cell system according to the invention incorporates the feature that at least one storage unit is provided for supplying fuel to the fuel cell unit in dependence upon the quality of the reformate.

Fuel of unsuitable quality (that is, when the reformate quality, for example, drops below a defined threshold value), can, in this way, be guided past the fuel cell unit in an advantageous manner while, at the same time, the supply of fuel of suitable quality to the fuel cell unit can be realized. In this way, the storage unit of the fuel cell system of the invention ensures that damage to the fuel cell unit by fuel of unsuitable quality is prevented and that the supply and therefore the electrical output power of the fuel cell unit can still be controlled. For example, the supply of fuel from the storage unit can be adjusted in dependence upon the configuration of the fuel cell so that the output power of the fuel cell unit does not drop off.

Preferably, the storage unit is so dimensioned that it bridges the duration until the reestablishment of the proper reformate quality. Alternatively hereto, and in a further embodiment of the invention, the storage unit or several storage units are at least so dimensioned that a proper running down, that is, a bringing of the entire fuel cell system to standstill can be realized. Especially generously held storage units or times are, for example, advantageous for traction applications such as an automobile, railroad, bicycle with ancillary engine, ship, aircraft or the like.

If the fuel cell system is one wherein disturbances occur rarely and/or for only a short time (that is, for example, in time durations of one or several months or only for fractions of seconds), then the use of an irreversible fuel storage is advantageous. If required, charged metal hydride stores or devices can be used which release fuel via a chemically irreversible process. Inter alia, the conversion of water with suitable metal hydrides is realizable as is the action of acids on suitable non-noble metals or the like.

A further embodiment of the invention is the additional or alternative use of a reversible store. For this purpose, a pressure store or the like is, for example, usable. Present day fuel cell systems exhibit comparatively short disturbances which occur regularly. These short disturbances can, for example, at least be compensated by means of a reversible storage unit. The combination of at least one reversible storage unit and an irreversible storage unit is especially advantageous when the duration of running down the entire system (for example, of a vehicle) is significantly greater than the duration of the usual disturbances.

Advantageously, the sensor-dependent drive of the valve or valves takes place automatically. The discharge of the reformate of unsuitable quality as well as feeding of fuel of suitable quality to the fuel cell unit can be realized.

Preferably, a filling of the storage unit is provided by means of a connecting line between the reformer unit and the storage unit at least during a part-load phase of the fuel cell unit. In this way, comparatively frequently occurring disturbances of the reformate quality can be compensated automatically in an advantageous manner also for a long time and especially without interrupting the operation of the fuel cell system. Furthermore, an especially economic storage of fuel of suitable quality is to be ensured preferably, for example, during an operating phase of the fuel cell system without disturbances. Filling of the reversible storage unit is also conceivable.

In a special further embodiment of the invention, at least one pressure generating unit is arranged between the reformer unit and the storage unit. In this way, it is advantageously made possible that the storage unit can be charged with a comparatively large quantity of fuel and with the operating pressure which is needed for the operation of the fuel cell system. Furthermore, the metering of fuel to the fuel cell by means of a corresponding pressure generating unit can be realized at an adjustable pressure or fuel flow. The pressure generating unit is preferably also utilizable as a metering unit. For the above, a pump, a compressor, a pressure transfer unit or the like can be used.

Preferably, at least one further storage unit for storing a fuel is provided which fuel differs in its quality from the fuel of the other storage unit. With the additional storage unit, preferably the storage of the reformate of insufficient quality is realizable. With this measure, the comparatively complexly produced reformate is not lost for further uses to the fuel cell system.

If required, a recirculation of the reformate can be provided by means of a recirculation line into the reformer unit in flow direction ahead of the valve in dependence upon the reformate quality. Preferably, this takes place for heating the reformer unit or especially shifted in time during a disturbance-free operating phase for further processing of the reformate. A direct recirculation of the reformats of inadequate quality (that is, without the additional storage unit) into the reformer unit is likewise realizable.

An advantageous time displaced use of the reformats of unwanted quality (for example, in the shift unit or in the oxidation unit) is also ensured by means of the further storage unit so that a possible overloading of the corresponding units can be avoided.

In a special embodiment of the invention, a fuel of an unwanted reformate quality can be supplied in common with the reformate to the fuel cell unit by means of the further storage unit. Advantageously, a time displaced metering of fuel with unwanted reformats quality to the fuel cell unit can be realized whereby a thinning with reformate, that is, with fuel of higher quality, can be realized. In this way, damage or other negative effects on the fuel cell unit can be avoided.

In an advantageous manner, at least one metering unit for controlling the reformate flow and/or fuel flow is provided so that the further use of the reformats of unwanted reformate quality or fuel can be controlled. Advantageously, the metering takes place during the thinning for the fuel cell unit as well as during the recirculation into the reformer unit or into the shift unit or oxidation unit.

Furthermore, the use of the reformats of unsuitable quality in addition to the renewed processing in the above-mentioned reactor units and in addition to the warming of the reformer unit is advantageous also for additional units within the fuel cell system. If required, separate heating units or the use of already existing heating units are to be included in an advantageous manner. Furthermore, another use for a reformate of a quality, which is unsuitable for the fuel cell unit, can be provided, such as heating the interior of a vehicle or the like.

Furthermore, a reformate of high quality but also of unwanted quality can, for example, be used for any desired purpose outside of the fuel cell, for example, for warming reacting units during a cold start operation or the like.

BRIEF DESCRIPTION OF THE DRAWING

The invention will now be described with reference to the single FIGURE (FIG. 1) of the drawing which shows a schematic block diagram of a fuel cell system according to the invention.

DESCRIPTION OF THE PREFERRED EMBODIMENTS OF THE INVENTION

Figure 1:
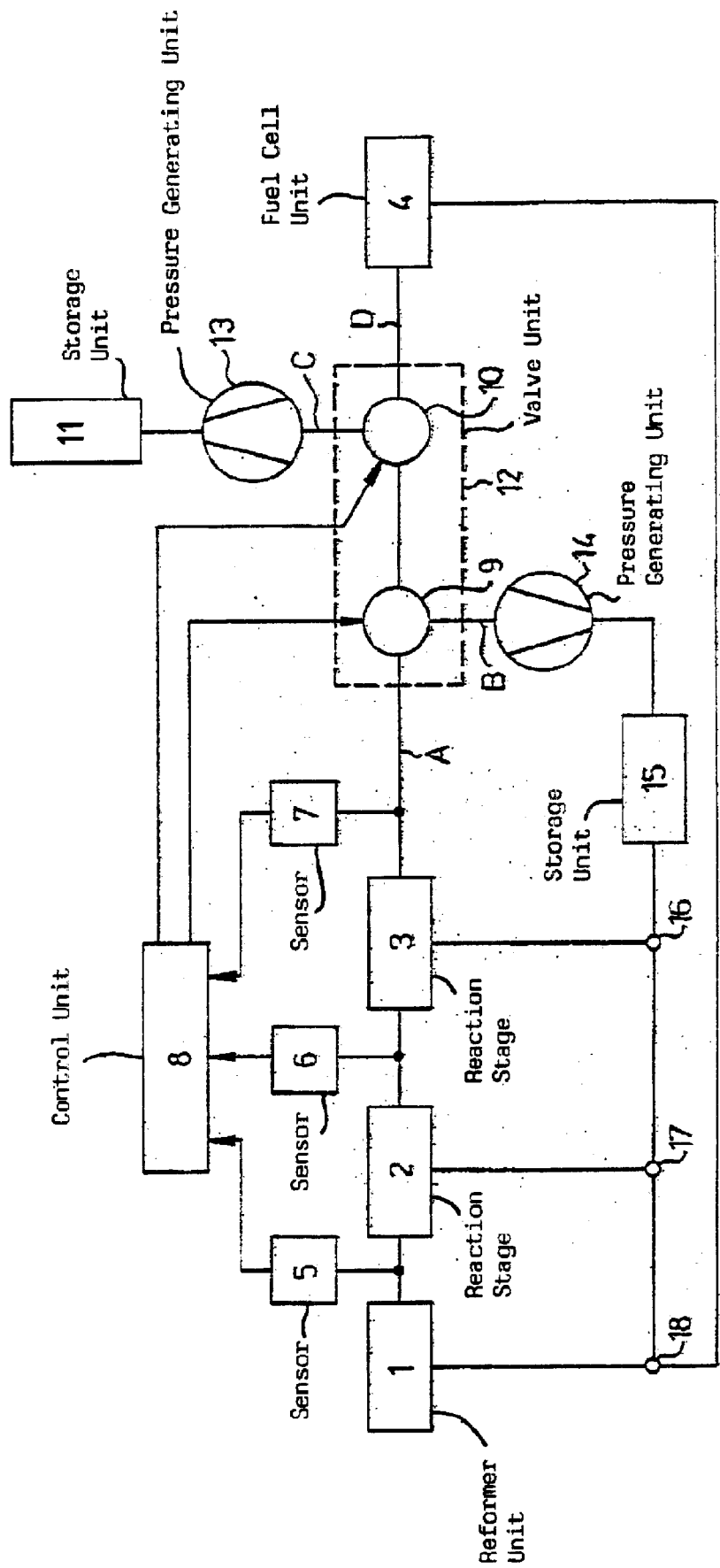

In FIG. 1, a block diagram of an embodiment of a fuel cell system according to the invention is shown. The fuel cell system includes a reformer unit 1 which converts a fuel such as gasoline, diesel oil, natural gas, methanol or the like into a hydrogen-rich reformate. This hydrogen-rich reformate contains especially still relevant carbon monoxide components which are almost completely removed in reaction stages (2, 3) downstream of the reformer unit 1. The two reaction stages (2, 3) require especially water and air for this process. In this way, the reformate obtains a desired quality which is necessary for the operation of a fuel cell unit 4 so that damage especially damage of the fuel cell electrodes can be avoided which, in turns would lead to a reduction of the electrical output power of the fuel cell unit 4.

With the aid of sensors (5, 6, 7) and a control unit 8, the production process of the fuel, especially the carbon monoxide concentrations of the water-rich reformate are monitored.

The production of a fuel of desired quality for the fuel cell unit 4 exhibits again and again occurring short-term small disturbances in present-day fuel cell systems, inter alia, the so-called "burps". These small disturbances are characterized especially by an unwanted CO concentration in the reformate. In this way, the fuel cell unit 4 is, in general, affected by a longer-term CO occupation of the electrode.

According to the invention, a valve (9, 10) can be controlled by means of the sensors (5, 6, 7) as well as the control unit 8 so that, in the case of a disturbance in the reformer unit 1 or the reaction stages (2, 3), on the one hand, the valve 9 detours the reformate of unwanted quality past the fuel cell unit 4 and, on the other hand, by means of valve 10, makes possible a metering of fuel of desired quality from a storage unit 11 to the fuel cell unit 4. Here, the valve 9 connects a line A to a line B and, almost at the same time, the valve 10 connects a line C to a line D. A fluid flow between the valve 9 and the valve 10 is prevented. In a special embodiment, the valve 9 and the valve 10 are assembled to a valve unit 12, for example, to a multi-directional valve or the like.

In a further embodiment of the invention, a pressure generating unit 13 is mounted between the valve 10 and the storage unit 11. Especially with the pressure generating unit 13 and the valves 9 and 10, a loading of the storage unit 11 during a cart-load phase of the fuel cell unit 4 with reformate is possible from the reformer unit 1, that is, the reaction stages (2, 3). The valve 9 is so switched that reformate of the line A flows from valve 9 to valve 10. The valve 10 supplies reformate to the fuel cell unit 4 as well as to the pressure generating unit 13 and/or the storage unit 11 as required. For this purpose, at least the valve 10 can be realized, for example, as a clocked valve 10.

In a further embodiment of the invention, an additional pressure generating unit 14 as well as an additional storage unit 15 for storing reformate of unwanted quality are provided with a disturbance in the components 1, 2 or 3, corresponding unwanted reformate is intermediately stored by means of the valve 9, the pressure generating unit 14 and the storage unit 15. This intermediately stored reformate can, for example, be supplied in a disturbance-free operation of the components 1, 2 or 3 alternatively to the fuel cell unit 4 by means of the pressure generating unit 14, the valve 9 as well as the valve 10. In this way, and especially by means of the pressure generating unit 14 or the valve unit 12, a defined mixing of the intermediately stored reformate with the just produced reformate can take place so that damage of the fuel cell unit 4 is prevented.

As an alternative to the above, the reformate, which is intermediately stored in the storage unit 15, can be supplied via branches 16, 17, 18 to the reformer unit 1 and/or to the reaction stages (2, 3), for example, for heating or for further processing. The branches 16, 17, 18 can, inter alia, be configured as metering valves so that an exactly controllable metering of intermediately stored reformate of unwanted quality is ensured.

In present day fuel cell systems, anode exhaust gas from the fuel cell unit 4, especially from the reformer unit, is supplied to the latter for heating. By means of the branch 18, a joining of the anode exhaust-gas flow and the intermediately stored reformate flow can be realized.

In a further embodiment of the invention, the storage unit 15 can be omitted so that the pressure generating unit 14 directly supplies reformate of unwanted quality to the reformer unit 1, that is, to the reaction stages (2, 3), for example, for heating or for processing. The pressure generating unit 14 as well as the pressure generating unit 13 can be configured as a pump, compressor, or the like.

The storage units (11, 15) can be realized as reversible storage units such as pressure gas storage units so that a continuous filling and unloading is ensured. Furthermore, an irreversible storage unit can be connected, as required, to the valve 10 so that this storage unit can be used (possibly together with the storage unit 11) for providing a controlled run down or shutdown of the entire system. Especially with respect to applications for motor vehicles, it can be necessary that the vehicle must be driven to the side so that the fuel cell system, inter alia, additionally includes an irreversible storage unit for this application.

According to the invention, the sensor 7 can, for example, be adequate for feeding the fuel to the fuel cell unit 4 by means of the storage unit 11 in dependence upon the reformate quality. However, it is known that significant malfunctions of the reformer unit 1 can be compensated only in part by the reaction stages (2, 3) connected downstream. The closer a sensor is mounted to the fuel cell unit 4, the more complete is the monitoring of the entire fuel cell system. With the use of several sensors (5, 6, 7) along the reformate generating path, the control unit 8 can differentiate more precisely the function of the individual components (1, 2, 3). For example, in the case of a malfunction, the control unit 8 can more precisely locate this malfunction and this leads to a simpler maintenance or repair of the fuel cell system, if necessary. All already known sensor types can be used as sensors (5, 6, 7) for monitoring the reformate which is to be produced.

It is understood that the foregoing description is that of the preferred embodiments of the invention and that various changes and modifications may be made thereto without departing from the spirit and scope of the invention as defined in the appended claims.

What is claimed is:

1. A fuel cell system comprising:

a fuel cell unit;

a reformer unit for generating a reformate as a fuel for said fuel cell unit;

sensor means for monitoring the quality of said reformate;

a storage unit for holding fuel which can be fed to said fuel cell, valve means for connecting said storage unit to said fuel cell unit so as to permit fuel contained in said storage unit to be fed to said fuel cell unit in dependence upon said quality of said reformate; and, control means for driving said valve means in dependence upon said sensor means.

2. The fuel cell system of claim 1, further comprising a connecting line connected between said reformer unit and said storage unit to permit filling said storage unit at least during a part-load phase of said fuel cell unit.

3. A fuel cell system comprising:

a fuel cell unit;

a reformer unit for generating a reformate as a fuel for said fuel cell unit;

sensor means for monitoring the quality of said reformate;

a storage unit for holding fuel which can be fed to said fuel cell;

valve means for connecting said storage unit to said fuel cell unit so as to permit fuel contained in said storage unit to be fed to said fuel cell unit in dependence upon said quality of said reformate;

control means for driving said valve means in dependence upon said sensor means; and, at least one pressure generating unit mounted between said reformer unit and said storage unit.

4. A fuel cell system comprising:

a fuel cell unit;

a reformer unit for generating a reformate as a fuel for said fuel cell unit;

sensor means for monitoring the quality of said reformate;

a storage unit for holding fuel which can be fed to said fuel cell;

valve means for connecting said storage unit to said fuel cell unit so as to permit fuel contained in said storage unit to be fed to said fuel cell unit in dependence upon said quality of said reformate;

control means for driving said valve means in dependence upon said sensor means; and, said storage unit being a first storage unit and said fuel cell system further including a second storage unit for storing a fuel which differs from the quality of the fuel of said first storage unit.

5. The fuel cell system of claim 4, wherein said second storage unit is connected to said valve means and said valve means includes means for facilitating a defined mixing of the reformate intermediately stored in said second storage unit with the reformate from said reformer unit.

6. A fuel cell system comprising:

a fuel cell unit;

a reformer unit for generating a reformate as a fuel for said fuel cell unit;

sensor means for monitoring the quality of said reformate;

a storage unit for holding fuel which can be fed to said fuel cell;

valve means for connecting said storage unit to said fuel cell unit so as to permit fuel contained in said storage unit to be fed to said fuel cell unit in dependence upon said quality of said reformate;

control means for driving said valve means in dependence upon said sensor means; and, a recirculation line connected, in flow direction, ahead of said valve means for recirculating the reformate into said reformer unit in dependence upon the quality of said reformate.

7. The fuel cell system of claim 1, further comprising at least one metering unit for controlling the reformate flow.

8. A motor vehicle comprising a fuel cell system including: a fuel cell unit; a reformer unit for generating a reformate as a fuel for said fuel cell unit; sensor means for monitoring the quality of said reformate; a storage unit for holding fuel which can be fed to said fuel cell; valve means for connecting said storage unit to said fuel cell unit so as to permit fuel contained in said storage unit to be fed to said fuel cell unit in dependence upon said quality of said reformate; and, control means for driving said valve means in dependence upon said sensor means.

9. A generator unit comprising a fuel cell system including: a fuel cell unit; a reformer unit for generating a reformate as a fuel for said fuel cell unit; sensor means for monitoring the quality of said reformate; a storage unit for holding fuel which can be fed to said fuel cell; valve means for connecting said storage unit to said fuel cell unit so as to permit fuel contained in said storage unit to be fed to said fuel cell unit in dependence upon said quality of said reformate; and, control means for driving said valve means in dependence upon said sensor means.

10. The fuel cell system of claim 1, wherein said sensor means for monitoring the quality of said reformate is a sensor for detecting a chemical composition of said reformate.

11. The fuel cell system of claim 1, wherein said sensor means for monitoring the quality of said reformate is a sensor for monitoring the carbon monoxide content of said reformate.

* * * * *